(12) United States Patent
Witten

(10) Patent No.: US 8,681,949 B1
(45) Date of Patent: Mar. 25, 2014

(54) SYSTEM, METHOD, AND COMPUTER PROGRAM FOR AUTOMATED NON-SOUND OPERATIONS BY INTERACTIVE VOICE RESPONSE COMMANDS

(75) Inventor: David Witten, Arlington, VA (US)

(73) Assignee: Amdocs Software Systems Limited, Dublin (IE)

( * ) Notice: Subject to any disclaimer, the term of this patent is extended or adjusted under 35 U.S.C. 154(b) by 73 days.

(21) Appl. No.: 13/305,676

(22) Filed: Nov. 28, 2011

(51) Int. Cl.
*H04M 1/64* (2006.01)

(52) U.S. Cl.
USPC .......................................... 379/72; 379/88.18

(58) Field of Classification Search
USPC ................................................ 379/72, 88.18
See application file for complete search history.

(56) References Cited

U.S. PATENT DOCUMENTS

| | | | |
|---|---|---|---|
| 5,345,501 A * | 9/1994 | Shelton ........................ | 379/88.2 |
| 5,822,405 A * | 10/1998 | Astarabadi ................ | 379/88.04 |
| 5,915,001 A * | 6/1999 | Uppaluru ................... | 379/88.22 |
| 7,027,990 B2 * | 4/2006 | Sussman .................... | 704/270.1 |
| 7,054,939 B2 * | 5/2006 | Koch et al. .................... | 709/227 |
| 7,526,073 B2 * | 4/2009 | Romeo ....................... | 379/88.18 |
| 7,711,095 B2 * | 5/2010 | Erhart et al. ............... | 379/88.13 |
| 2003/0021397 A1* | 1/2003 | Wengrovitz ............... | 379/93.15 |
| 2006/0041470 A1* | 2/2006 | Filho et al. ...................... | 705/14 |
| 2007/0133521 A1* | 6/2007 | McMaster ..................... | 370/352 |

OTHER PUBLICATIONS

Schenck, S., "Yamaha InfoSound Sends QR-Code-Like Phone Data Over TV Audio," Dec. 20, 2010, retrieved from http://pocketnow.com/smartphone-news/yamaha-infosound-sends-qr-code-like-smartphone-data-over-tv-audio.

* cited by examiner

*Primary Examiner* — Simon Sing
(74) *Attorney, Agent, or Firm* — Zilka-Kotab, PC

(57) ABSTRACT

A system, method, and computer program product are provided for automated non-sound operations by interactive voice response commands. In use, a command from an interactive voice response application is received. Additionally, a non-sound operation requested to be performed via the command is identified. Further, the identified non-sound operation is automatically performed.

15 Claims, 5 Drawing Sheets

US 8,681,949 B1

SYSTEM, METHOD, AND COMPUTER PROGRAM FOR AUTOMATED NON-SOUND OPERATIONS BY INTERACTIVE VOICE RESPONSE COMMANDS

FIELD OF THE INVENTION

The present invention relates to interactive voice response applications, and more particularly to output of interactive voice response applications.

BACKGROUND

Interactive voice response applications (IVRs) have conventionally been used for outputting audio, such as speech, to a user and to a lesser extent to send messages, such as email or SMS messages. Thus, the IVRs allow a digital device to send communications to a user through the use of voice or messages. So the IVRs have been limited in that they cannot issue commands to the device, to, for example, show a web page or send information from the device to the IVR.

There is thus a need for addressing these and/or other issues associated with the prior art.

SUMMARY

A system, method, and computer program product are provided for automated non-sound operations by interactive voice response commands. In use, a command from an interactive voice response application is received. Additionally, a non-sound operation requested to be performed via the command is identified. Further, the identified non-sound operation is automatically performed.

DETAILED DESCRIPTION

Figure 1:
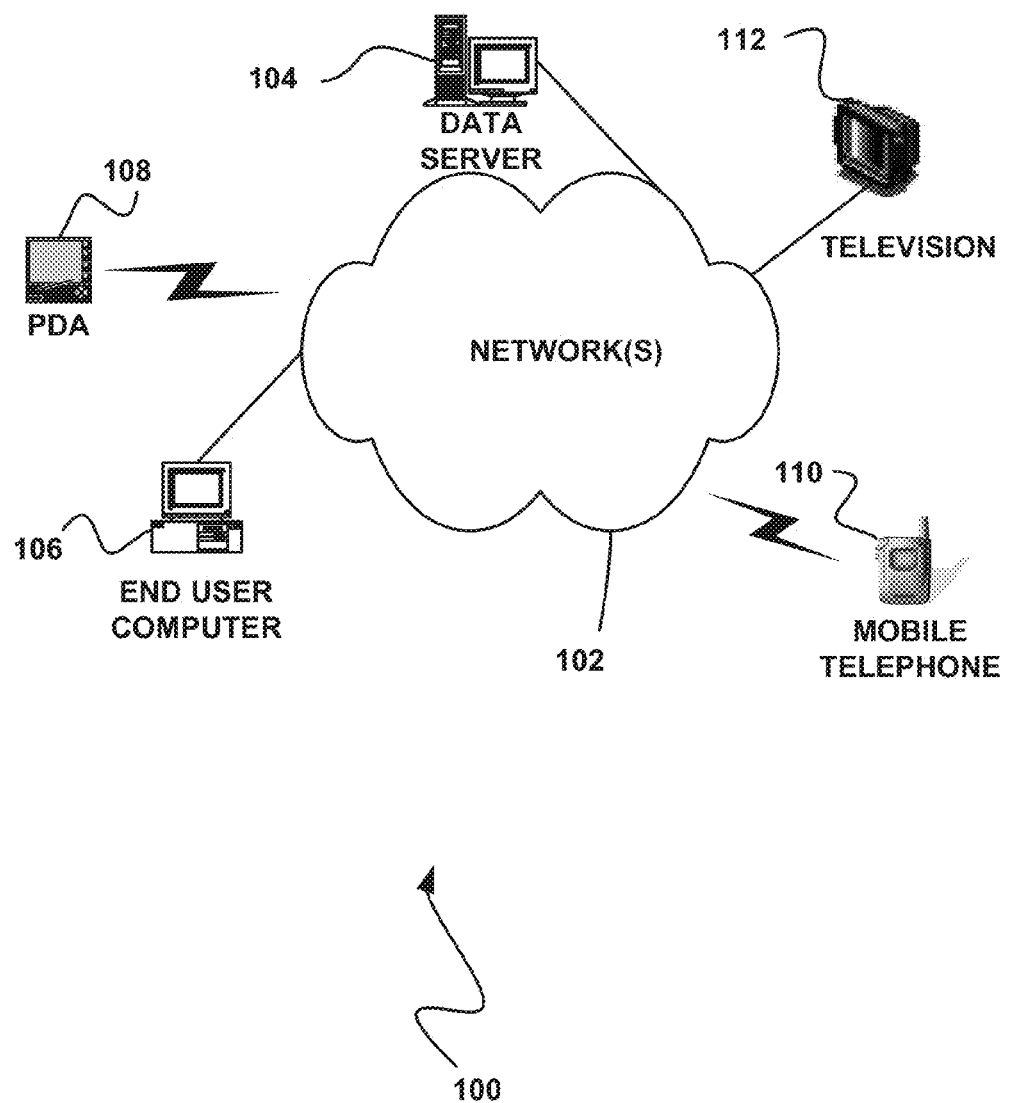
FIG. 1 illustrates a network architecture, in accordance with one possible embodiment.

FIG. 1 illustrates a network architecture 100, in accordance with one possible embodiment. As shown, at least one network 102 is provided. In the context of the present network architecture 100, the network 102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PDA) device 108, a mobile phone device 110, a television 112, etc.

Figure 2:
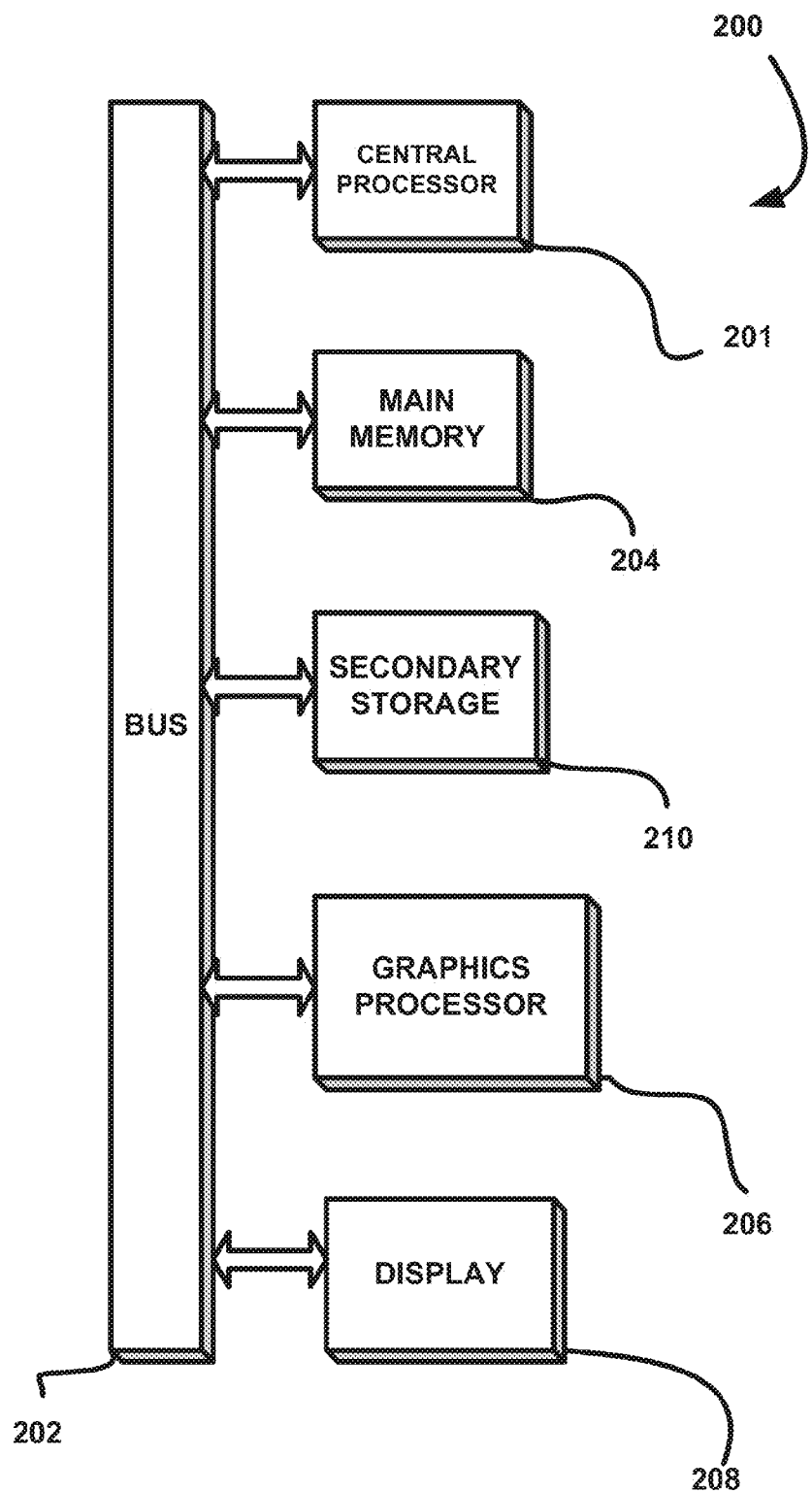
FIG. 2 illustrates an exemplary system, in accordance with one embodiment.

FIG. 2 illustrates an exemplary system 200, in accordance with one embodiment. As an option, the system 200 may be implemented in the context of any of the devices of the network architecture 104) of FIG. 1. Of course, the system 200 may be implemented in any desired environment.

As shown, a system 200 is provided including at least one central processor 201 which is connected to a communication bus 202. The system 200 also includes main memory 204 [e.g. random access memory (RAM), etc.]. The system 200 also includes a graphics processor 206 and a display 208.

The system 200 may also include a secondary storage 210. The secondary storage 210 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 204, the secondary storage 210, and/or any other memory, for that matter. Such computer programs, when executed, enable the system 200 to perform various functions (to be set forth below, for example). Memory 204, storage 210 and/or any other storage are possible examples of tangible computer-readable media.

Figure 3:
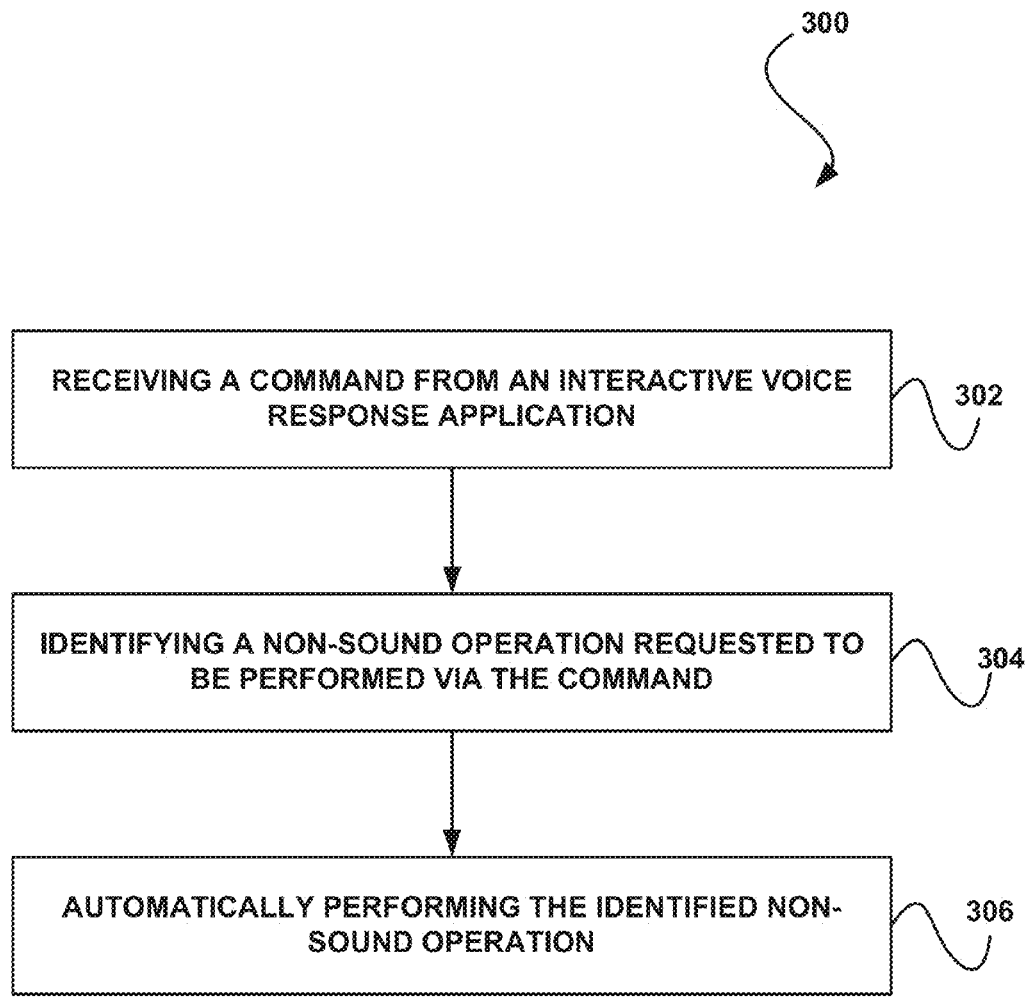
FIG. 3 illustrates a method for automatically performing non-sound operations in response to interactive voice response commands, in accordance with one embodiment.

FIG. 3 illustrates a method 300 for automatically performing non-sound operations in response to interactive voice response commands, in accordance with one embodiment. As an option, the method 300 may be carried out in the context of the details of FIGS. 1 and/or 2. Of course, however, the method 300 may be carried out in any desired environment. Further, the aforementioned definitions may equally apply to the description below.

As shown in operation 302, a command from an interactive voice response application (IVR) is received. In the context of the present description, the IVR is any set of program instructions or other (e.g. packaged) code that is capable of directing the output of speech to a user. For example, the IVR may direct the output of speech by a client device of the user.

In the present embodiment, as noted above, a command is received from the IVR. In one embodiment, the command may be a sound output by the IVR. In another embodiment, the command may be a textual message output by the IVR, such as a short message service message (SMS). Of course, however, the message may be in any desired format by which the IVR is equipped to output commands.

Additionally, as shown in operation 304, a non-sound operation requested to be performed via the command is identified. In the context of the present description, the non-sound operation includes any operation that excludes the output of sound (e.g. speech, etc.). For example, the non-sound operation may include displaying content, The content to be displayed may optionally be a webpage presenting information (e.g. text, images, etc.). As another, example, the non-sound operation may include uploading content to the IVR. The content to be uploaded may optionally be a file, descriptive information describing a state of a device that received the command, etc.

In one embodiment, the non-sound operation may be indicated in the command, such that the non-sound operation may be identified directly from the command. In another embodiment, the non-sound operation may be mapped to the command, such that the non-sound operation may be identified by mapping the command to the non-sound operation. Of course, it should be noted that the non-sound operation may be identified in any manner that is based on the command.

Further, as shown in operation 306, the identified non-sound operation is automatically performed. The non-sound operation may be performed by executing the non-sound operation. For example, the device that received the command from which the non-sound operation is identified may perform the non-sound operation, Moreover, the non-sound operation is automatically performed such that manual intervention for initiating the performance of the operation is avoided. In one embodiment, the device that received the command may automatically perform the non-sound operation directly in response to identification of the non-sound operation from the command. In another embodiment, the device that received the command may automatically perform the non-sound operation in response to an automatic (e.g. non-human) validation of the non-sound operation identified from the command.

To this end, an IVR may issue a command to cause a device receiving the command to automatically perform an operation other than the output of sound. For example, the IVR may issue the command by way of a message, a sound, or any other output (e.g. digital output) capable of being utilized to indicate a non-sound operation that is requested to be performed. Upon receipt of the command, the device may identify the non-sound operation and automatically perform the identified non-sound operation. Accordingly, the IVR may directly cause the device to automatically perform an operation, such that intervention by a user is not necessarily required.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
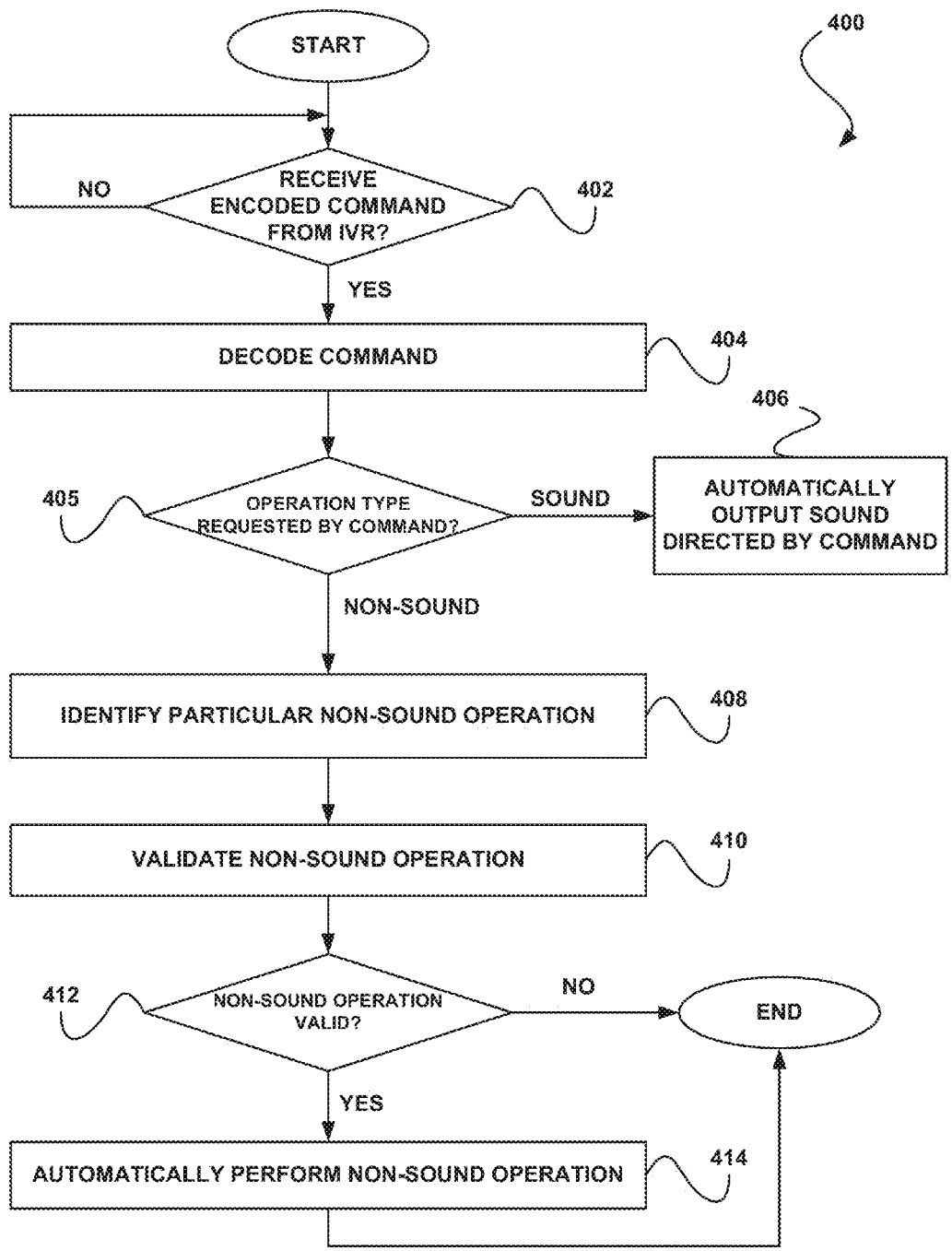
FIG. 4 illustrates a method for automatically performing non-sound operations in response to validated interactive voice response commands, in accordance with another embodiment.

FIG. 4 illustrates a method 400 for automatically performing non-sound operations in response to validated interactive voice response commands, in accordance with another embodiment. As an option, the method 400 may be carried out in the context of the details of FIGS. 1-3. Of course, however, the method 400 may be carried out in any desired environment. Again, the aforementioned definitions may equally apply to the description below.

As shown in decision 402, it is determined whether an encoded command is received from an IVR. The encoded command may include any command issued by an IVR that is encoded and that is used for requesting performance of an operation by a device receiving the command. The command may be encoded using any desired type of encoding scheme, and may further be of any desired type, such as a sound, character message, etc. As an option, the command may be conveyed via a sound which encodes the command and is output by the IVR.

If it is determined that an encoded command is not received from an IVR, the method 400 continues to wait for receipt of such an encoded command. Once it is determined that an encoded command is received from an IVR, the encoded command is decoded. Note operation 404. Further, a type of operation requested by the command is determined, as shown in decision 405. Thus, the decoded command may be analyzed to determine a type of operation being requested via the command.

If it is determined that the type of operation requested by the command is a sound operation (i.e. an operation involving an output of sound), the operation is automatically performed by automatically outputting a sound directed by the command. Note operation 406. If, however, it is determined that the type of operation requested by the command is a non-sound operation (i.e. an operation that is at least in part exclusive of an output of sound), the particular non-sound operation requested is identified. Note operation 408. Thus, the encoded command may be decoded to identify the particular non-sound operation requested to be performed via the command. For example, the decoded command may be mapped to the particular non-sound operation, or the particular non-sound operation may be directly retrieved from the decoded command.

Moreover, the non-sound operation is validated (e.g. according to predetermined rules, etc.), as shown in operation 410. In one embodiment, only calls with certain known phone numbers (e.g. phone numbers predetermined to be trusted) may be validated as being allowed to command non-sound operations by an encoded sound. For example, a smart phone may have a list of phone numbers. A command may optionally only be validated for execution if a phone initiated an outgoing call to one of the phone numbers in the list. As a similar example, only SMS messages from known trusted senders may be validated as being allowed to command non-sound operations. As yet another option, the validation may be for the command to contain encrypted validating information which is verified by the command executing software on the device. More plainly, the command executing software may accept only a command that contained an encrypted key known both to the device and the IVR owner.

In another embodiment, only certain types of content (e.g. web pages) may be validated as being allowed to be commanded to be displayed. In another embodiment, only content from sources predetermined to be trusted [e.g. companies, domains, uniform resource locators (URLs), etc.] may be validated as being allowed to be commanded to be displayed. Just by way of example, only web pages from a trusted source that provides the IVR may be validated as being allowed.

In yet another embodiment, a confirmation of the non-sound operation requested by the command may be required in order for the non-sound operation to be validated as being allowed to be performed. The confirmation may be provided by a user, as an option. For example, a user may be asked whether web pages on a certain domain are to be allowed, or operations requested to be performed from the current phone number are to be allowed. The user's response may optionally be remembered for use in validating non-sound operations identified from subsequently commands.

To this end, it is determined from the validation of operation 410 whether the non-sound operation is valid. If the non-sound operation is not valid, the method 400 terminates. If the non-sound operation is valid, the non-sound operation is automatically performed (operation 414), after which the method 400 terminates. In this way, the particular non-sound operation identified from the IVR command may be conditionally performed based on a validation of the non-sound operation.

In one exemplary embodiment, an IVR may determine that information to be provided to a user could be better (e.g. more fruitfully) conveyed to a user in a manner other than playing speech to the user. In response to such a determination, the IVR may output a sound, a sequence of sounds, or any digital output in which a command requesting a non-sound operation is encoded. In response to receipt of the command, a device of the user may decode the command, identify the non-sound operation requested by the command, and automatically perform the non-sound operation (e.g. displaying a web page presenting the information to the user).

In another exemplary embodiment, an IVR may determine that information needed to make a decision could be better received in a manner other than receiving speech from a user. In response to such a determination, the IVR may output a sound, a sequence of sounds, or any digital output in which a command requesting a non-sound operation is encoded. In response to receipt of the command, a device of the user may decode the command, identify the non-sound operation requested by the command, and automatically perform the non-sound operation (e.g. uploading content describing a state of the device of the user to the IVR, for use by the IVR in diagnosing a reason for a call from the user to the IVR).

As an option, an owner (i.e. provider) of the IVR may optionally cause whatever cost is incurred by the sending of the command or the execution of the command to not be incurred by the user of the device. For example, a phone company may not charge the user for receipt of an SMS containing a command, nor charge for the use of any data plan needed to show a web page specified by the action.

Figure 5:
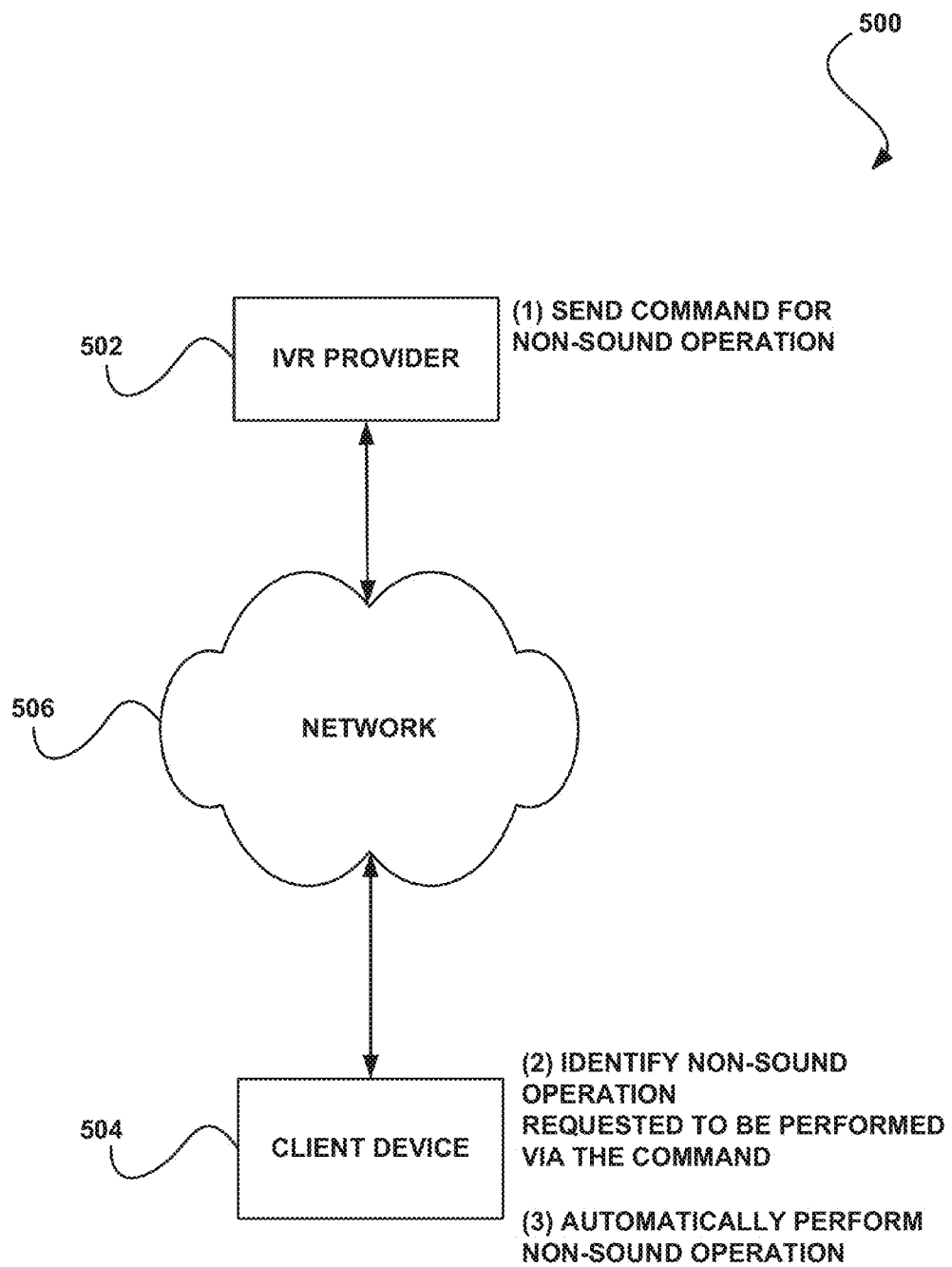
FIG. 5 illustrates a system for automated non-sound operations prompted by interactive voice response commands in accordance with yet another embodiment.

FIG. 5 illustrates a system 500 for automated non-sound operations prompted by interactive voice response commands in accordance with yet another embodiment. As an option, the system 500 may be implemented in the context of the details of FIGS. 1-4. Of course, however, the system 500 may be implemented in any desired environment. Further, the aforementioned definitions may equally apply to the description below.

As shown, an IVR provider 502 is in communication with a client device 504 via a network 506. The network 506 may be a telecommunications network, the Internet, etc. In the present embodiment, the IVR provider 502 is at least one serving device having an IVR application installed thereon. Additionally, the client device 504 is any device of a user capable of interacting with an IVR by receiving output from the IVR in the form of a command to play audio or perform other non-sound operations. For example, the client device 504 may be a mobile phone (e.g. smart phone), desktop computer, tablet computer, etc.

Thus, the IVR application may be installed on an interactive voice response device; (i.e. the IVR provider 502) separate from the client device 504 of the user.

The IVR application sends a command requesting a non-sound operation to the client device 504 over the network 506. As an option, the command may be sent (and thus received by the client device 504) in response to an action by the client device 504, such as a message sent by the client device 504 to the IVR application. The client device 504 therefore receives the command, identifies a non-sound operation requested to be performed via the command, and automatically performs the non-sound operation.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer readable medium encoded with computer codes, and when executed by a computing apparatus, said codes causing said computing apparatus to:
receive a command from an interactive voice response application;
identify a non-sound operation requested to be performed via the command; and
automatically perform the identified non-sound operation, the non-sound operation including uploading content to the interactive voice response application;
wherein the non-transitory computer readable medium is operable such that the command is a textual message output by the interactive voice response application;
wherein the textual message is a short message service message (SMS).

2. The non-transitory computer readable medium of claim 1, wherein the command is received by a client device of a user.

3. The non-transitory computer readable medium of claim 2, wherein the interactive voice response application is installed on an interactive voice response device separate from the client device of the user.

4. The non-transitory computer readable medium of claim 3, wherein the interactive voice response device is in communication with the client device of the user via a network.

5. The non-transitory computer readable medium of claim 2, wherein the command is received in response to an action by the client device of the user.

6. The non-transitory computer readable medium of claim 5, wherein the action by the client device includes a message sent by the client device to the interactive voice response application.

7. The non-transitory computer readable medium of claim 1, wherein the received command is an encoded command.

8. The non-transitory computer readable medium of claim 7, further comprising decoding the encoded command to identify the non-sound operation requested to be performed via the command.

9. The non-transitory computer readable medium of claim 1, wherein the non-sound operation is indicated in the command, such that the non-sound operation is identified directly from the command.

10. The non-transitory computer readable medium of claim 1, wherein the non-sound operation is mapped to the command, such that the non-sound operation is identified by mapping the command to the non-sound operation.

11. The non-transitory computer readable medium of claim 1, wherein the non-sound operation is exclusive of an output of speech.

12. The non-transitory computer readable medium of claim 1, wherein the identified non-sound operation is conditionally performed based on a validation of the non-sound operation.

13. A method, comprising:
receiving a command from an interactive voice response application;
identifying a non-sound operation requested to be performed via the command; and
automatically performing the identified non-sound operation, the non-sound operation including uploading content to the interactive voice response application;
wherein the command is a textual message output by the interactive voice response application;
wherein the textual message is a short message service message (SMS).

14. A system, comprising:
a processor for:
receiving a command from an interactive voice response application;
identifying a non-sound operation requested to be performed via the command; and
automatically performing the identified non-sound operation, the non-sound operation including uploading content to the interactive voice response application;

wherein the system is operable such that the command is a textual message output by the interactive voice response application;

wherein the textual message is a short message service message (SMS).

15. The system of claim 14, wherein the processor is coupled to memory via a bus.

\* \* \* \* \*